(12) United States Patent
Goppion

(10) Patent No.: US 10,702,077 B2
(45) Date of Patent: Jul. 7, 2020

(54) MUSEUM SHOWCASE WITH A BEARING PLATFORM

(71) Applicant: GOPPION S.P.A., Trezzano sul Naviglio (MI) (IT)

(72) Inventor: Alessandro Goppion, Milan (IT)

(73) Assignee: GOPPION S.P.A., Trezzano Sul Naviglio (MI) (IT)

( * ) Notice: Subject to any disclaimer, the term of this patent is extended or adjusted under 35 U.S.C. 154(b) by 0 days.

(21) Appl. No.: 15/228,467

(22) Filed: Aug. 4, 2016

(65) Prior Publication Data

US 2017/0290446 A1 Oct. 12, 2017

(30) Foreign Application Priority Data

Apr. 8, 2016 (IT) .............................. UA2016A2429

(51) Int. Cl.
| | |
|---|---|
| *A47F 3/12* | (2006.01) |
| *A47B 47/00* | (2006.01) |
| *F16B 12/42* | (2006.01) |
| *A47F 3/00* | (2006.01) |
| *F16B 7/04* | (2006.01) |

(Continued)

(52) U.S. Cl.
CPC .......... *A47F 3/125* (2013.01); *A47B 47/0091* (2013.01); *A47F 3/005* (2013.01); *A47F 3/12* (2013.01); *F16B 12/42* (2013.01); *A47B 96/1441* (2013.01); *A47B 2230/14* (2013.01); *F16B 7/0486* (2013.01); *F16B 2012/443* (2013.01)

(58) Field of Classification Search
CPC .. A47F 3/00; A47F 3/004; A47F 3/005; A47F 3/12; A47F 3/125; A47F 5/00; A47F 3/007; F16B 12/50; F16B 12/46
USPC ......................................................... 312/140
See application file for complete search history.

(56) References Cited

U.S. PATENT DOCUMENTS

| | | | |
|---|---|---|---|
| 4,021,127 A | | 5/1977 | Gasparro et al. |
| 4,086,857 A | * | 5/1978 | Igarashi ............... A47B 47/042 108/101 |
| 4,348,129 A | | 9/1982 | Conforti |

(Continued)

FOREIGN PATENT DOCUMENTS

| | | | |
|---|---|---|---|
| DE | 29616635 U1 | * 12/1996 | ......... A47B 47/0016 |
| DE | 102013106447 A1 | 12/2014 | |

(Continued)

OTHER PUBLICATIONS

EP2559359A1 Translated Description, 6 pages (Year: 2013).*

(Continued)

*Primary Examiner* — Andrew M Roersma
(74) *Attorney, Agent, or Firm* — Steinfl + Bruno LLP

(57) ABSTRACT

This museum showcase comprises a bearing frame and fixed and/or openable walls supported by the bearing frame. The bearing frame comprises a platform that includes joints connected to horizontal beams. The fixed and/or openable walls of the showcase are supported only by the joints. The weight of the walls is supported by the joints, whereas the horizontal beams are not subjected to significant stresses. It is thus possible to design the showcase in a particularly simple and therefore quick manner, choosing the lengths of each beam according to the dimensions of the showcase and leaving the support of the weights to just the joints.

10 Claims, 13 Drawing Sheets

(51) Int. Cl.
*A47B 96/14* (2006.01)
*F16B 12/44* (2006.01)

(56) References Cited

U.S. PATENT DOCUMENTS

| | | | | |
|---|---|---|---|---|
| 4,678,359 | A | * | 7/1987 | Keen .................. A47B 47/0008 312/140 |
| 5,069,512 | A | * | 12/1991 | Sykes .................... A47F 3/005 248/205.3 |
| 6,543,865 | B1 | * | 4/2003 | Louda .................... A47F 3/005 312/114 |
| 8,739,493 | B2 | * | 6/2014 | Carnes .................... E04C 3/04 403/294 |
| 2004/0088941 | A1 | * | 5/2004 | Boots .................. A47B 47/027 52/655.1 |
| 2008/0093527 | A1 | * | 4/2008 | Pezzoni .................... A47F 3/12 248/694 |
| 2014/0319979 | A1 | * | 10/2014 | Goppion ................. A47F 3/002 312/138.1 |

FOREIGN PATENT DOCUMENTS

| | | | | |
|---|---|---|---|---|
| EP | 2559359 | A1 | * 2/2013 | ............. A47F 3/004 |
| FR | 2571449 | A1 | 4/1986 | |
| WO | 80/02587 | A1 | 11/1980 | |
| WO | WO2015010492 | A1 | * 1/2015 | ......... A47B 47/0008 |

OTHER PUBLICATIONS

DE29616635U1 Translated Description, 19 pages (Year: 1996).*
Italian Search Report and Written Opinion for Italian Patent Application No. ITUA20162429 dated Apr. 8, 2016 on behalf of GOPPION S.P.A. Search Completion dated Dec. 2, 2016. 7 pages. Italian original + English translation.

* cited by examiner

MUSEUM SHOWCASE WITH A BEARING PLATFORM

CROSS REFERENCE TO RELATED APPLICATIONS

The present application claims priority to Italian Application No. UA2016A002429 filed on Apr. 8, 2016, which is incorporated herein by reference in its entirety.

FIELD

The present invention concerns a museum showcase, i.e. a showcase intended for being arranged in a display room such as a museum, an exhibition or similar and intended for conserving and displaying items of cultural heritage, such as works of art, historical artefacts and similar, in a protected environment. Hereinafter, sometimes for the sake of brevity just the term showcase will be used, by this in any case still meaning a museum showcase.

BACKGROUND

Showcases of this type must satisfy various requirements, in relation to the conservation and integrity of the displayed objects. In particular, high security must normally be ensured against possible unauthorised attempts at opening or breaking in, as well as ensuring adequate insulation between the internal and external environment. Moreover, it is suitable for these showcases to have a structure such as to facilitate the production processes.

For this purpose, showcase manufacturers use metallic materials—typically aluminium and iron—to make support structures, such as a bearing frame and/or a platform of the showcase; the fixed and openable walls of the showcase, typically made of transparent material, are mounted on these structures. Normally, the transparent material used is glass.

In particular, showcases have been developed with a base having a case formed from the walls mounted on top; the base houses the technical components of the showcase and it is thus normally closed by non-transparent walls, to prevent such components being seen; on the other hand, the walls of the case are totally or largely transparent to allow the displayed objects to be viewed.

The frame is normally built with beams welded together and then painted. In this way, it is possible to obtain a frame having the necessary solidity to adequately support all of the transparent walls (the weight of which can by very high, in large sized showcases) as well as any other element or accessory of the showcase.

The Applicant has realised that structures of this type are relatively complex to make.

The present invention thus sets the problem of facilitating the construction of the showcase.

SUMMARY

Consequently, the present invention concerns a showcase as defined in claim 1. Preferred characteristics are indicated in the dependent claims.

In particular, the invention concerns a museum showcase comprising a bearing frame and fixed and/or openable walls supported by the bearing frame, characterised in that the bearing frame comprises a platform that includes joints connected to horizontal beams, in which the fixed and/or openable walls are supported only by the joints.

In this way, the weight of the walls is supported by the joints, whereas the horizontal beams are not subject to significant stresses. It is thus possible to design the showcase in a particularly simple and therefore quick manner, by selecting the lengths of each beam according to the dimensions of the showcase and leaving the support of the weights to just the joints. Moreover, it is possible to easily define standard sizes for the joints, so as to be able to use the same joints for showcases of even very different sizes, the dimensions of the showcase only requiring the use of horizontal beams of different lengths; this can lead to an oversizing of the joints with respect to the need of any single specific showcase, however the advantages of such standardization certainly outweigh the drawbacks of such possible oversizing. The different lengths of the horizontal beams necessary to make showcases of different sizes do not require particular sizing calculations, except perhaps the choice of the length: indeed, the main weights of the showcase (i.e. the weights of the walls) still remain discharged substantially on only the joints. At most, it may be advantageous to use horizontal beams by selecting a range thereof of differentiated cross sections, since the greater dimensions of a showcase can make it advisable to in any case adopt greater sections for the horizontal beams.

Moreover, this structure allows quick and easy mounting of the showcase, as well as equally quick and easy dismounting thereof.

Preferably, the joints comprise corner joints, each connected to two horizontal beams. The presence of the corner joints, each connected to two horizontal beams, ensures the possibility of easily mounting on the joints both the openable walls, by means of hinges or other opening systems, and the fixed walls.

Preferably, the joints also comprise intermediate joints, arranged in intermediate positions on the horizontal beams. Indeed, the presence of these intermediate joints facilitates the support for horizontal beams of substantial length and also provides a further connection point for possible hinges, in the case in which the showcase has more than one openable wall on the same side.

Preferably, the platform comprises struts connected to two of the joints. Two joints connected in this way by struts form an assembly having particular solidity.

Preferably, the bearing frame comprises a ceiling, which includes upper joints connected to upper horizontal beams. The frame equipped with such a ceiling is provided with even greater solidity, which is particularly desirable in showcases of substantial height.

More preferably, the upper joints comprise upper corner joints, each connected to two horizontal beams.

More preferably, the upper joints comprise upper intermediate joints, arranged in intermediate positions on the upper horizontal beams.

These characteristics make it possible to have a substantial correspondence between the platform and the ceiling.

In order to connect the ceiling to the platform, preferably the museum showcase comprises vertical beams connected to the joints of the platform and to the upper joints of the ceiling. The vertical beams make it possible to discharge onto the platform (in particular onto the joints of the platform) the weight of the ceiling and of all of the possible elements or accessories carried by the ceiling; in this way, the vertical beams are in any case stressed substantially only by compression.

Preferably, each corner joint of the platform is connected to a respective one of the vertical beams and this vertical beam is connected to a corresponding one of the corner joints of the ceiling. In this way, the bearing frame is formed from joints (which carry substantially the entire weight of the showcase) and beams, including horizontal beams that are not substantially stressed and vertical beams that are stressed only by compression.

Preferably, each joint comprises a lower shell, an upper shell and connecting tie rods between the lower shell and the upper shell. Indeed, this structure with the two shells and the connecting tie rods makes it possible to adjust the joint in height, thus adapting it to horizontal beams having different sized sections.

Preferably, the lower shell and the upper shell comprise respective housing seats of the horizontal beams, in which each horizontal beam housed in said housing seats is clamped between said lower and upper shells by means of the tie rods. In this way, the height adjustment of the joint with respect to horizontal beams of different sizes is safe and easy.

Preferably, each joint comprises a threaded hole in one from the upper shell and the lower shell and a through hole in the other from the upper shell and the lower shell, and the tie rods are inserted in the through holes and in screwing engagement in the threaded holes.

Preferably, each joint comprises coupling seats provided on faces pointing towards the outside of the showcase. The coupling seats make it possible to couple any element, so that the weight thereof discharges directly onto the joint.

Preferably, each coupling seat comprises an upper shaped channel formed on the upper shell and a lower shaped channel formed on the lower shell, in which the upper and lower shaped channels are aligned with each other. In this way, the weight of any element coupled with the joint can discharge onto both of the shells thereof.

Preferably, the showcase comprises a bar inserted into the upper and lower shaped channels of one same coupling seat, wherein in the bar at least one threaded hole is formed. Such a bar allows any element to be coupled quickly and easily with the joint.

Preferably, the showcase comprises one or more from supports for walls, hinges, clamps or sealing devices, supported by joints by means of the coupling seats.

In a preferred embodiment, the museum showcase comprises support feet, applied to the joints of the platform, beneath them.

BRIEF DESCRIPTION OF DRAWINGS

Further characteristics and advantages of a museum showcase according to the invention will become clearer from the following description of a preferred embodiment thereof, made with reference to the attached drawings. In such drawings:

FIG. 2 is a perspective view of a corner joint of the showcase of FIG. 1;

FIG. 3 is a perspective view of a corner joint of the showcase of FIG. 1, in vertical section from inside the showcase;

FIG. 4 is a perspective view of an upper shell of the corner joint of FIG. 3, in an enlarged scale;

FIG. 5 is a perspective view of a lower shell of the corner joint of FIG. 3 in an enlarged scale;

FIG. 6 is a perspective view of the corner joint of FIG. 2;

FIG. 7 is a perspective view of the corner joint of FIG. 6 with an openable wall of the showcase;

FIG. 8 is a perspective view of a corner joint of the showcase of FIG. 1;

FIG. 9 is a perspective view of the corner joint of FIG. 3, with two fixed walls of the showcase;

FIG. 10 is a perspective view of an intermediate joint of the showcase of FIG. 1.

DESCRIPTION

Figure 1:
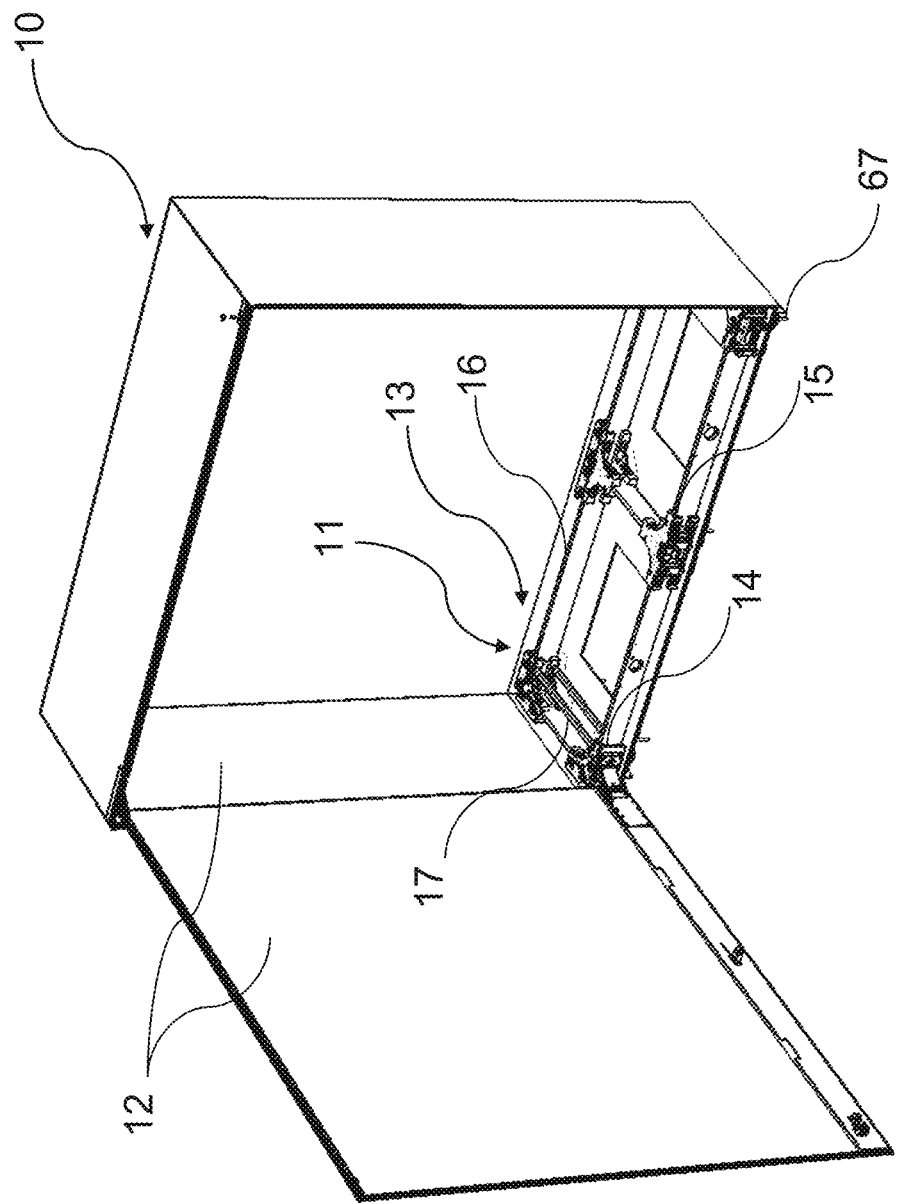
FIG. 1 is a perspective view of a showcase according to an embodiment of the invention.

In FIGS. 1-11, reference numeral 10 indicates a museum showcase according to the invention. The showcase 10 comprises a bearing frame 11 and fixed and/or openable walls 12, which are supported by the bearing frame 11 and define a display space S of the showcase.

In the showcase 10, the bearing frame 11 comprises a platform 13 which includes corner joints 14 and intermediate joints 15. The joints 14 and 15 are connected to horizontal beams 16. The fixed and/or openable walls 12 of the showcase 10 are supported only by the joints 14 and 15. The corner joints 14 are each connected to two of the horizontal beams 16; the intermediate joints 15 are arranged in intermediate positions on some of the horizontal beams 16.

Figure 9:
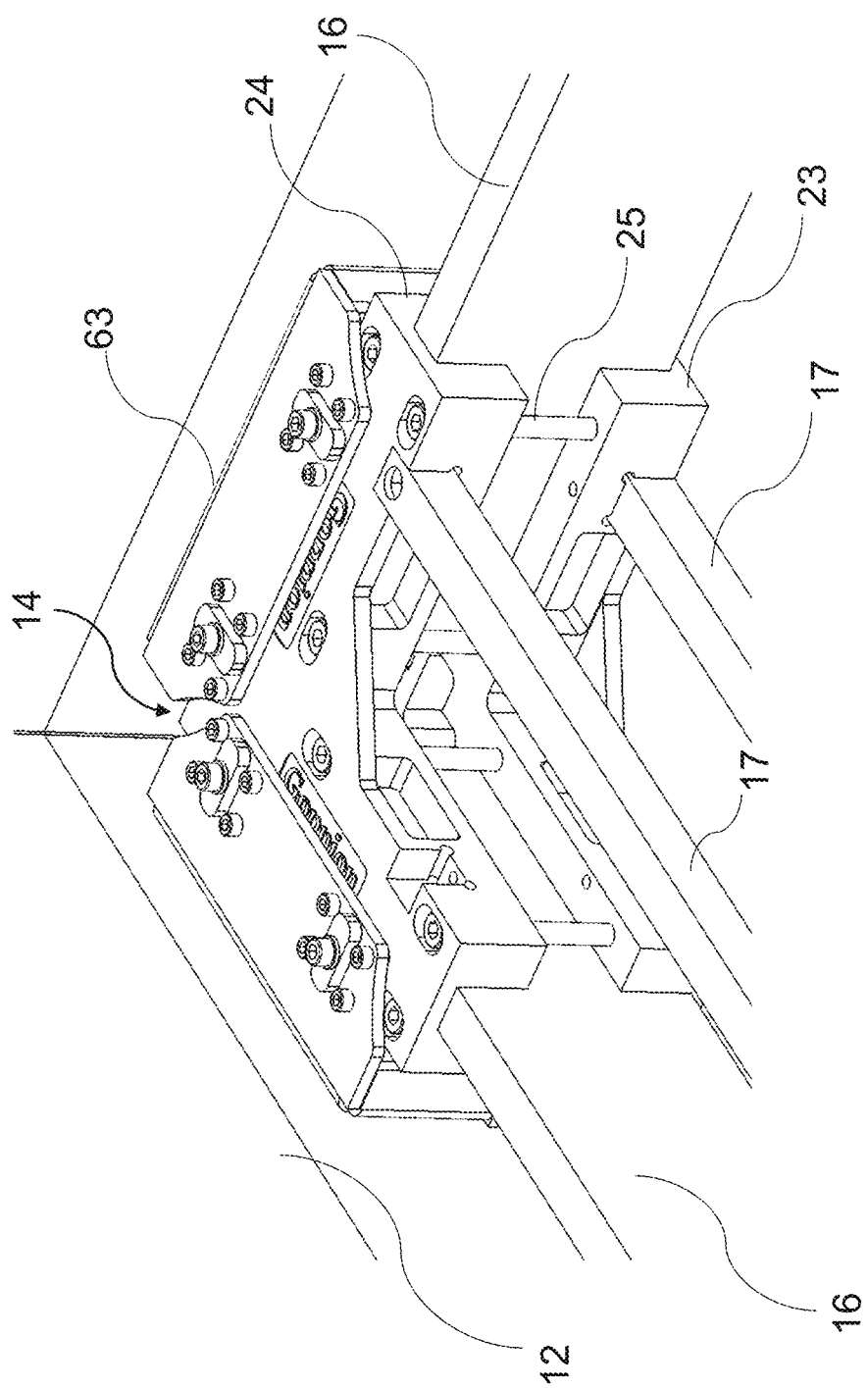

The platform 13 can also comprise struts 17, connected to two of the corner and/or intermediate joints 14, 15, as can be seen in FIGS. 1 and 9.

Figure 2:
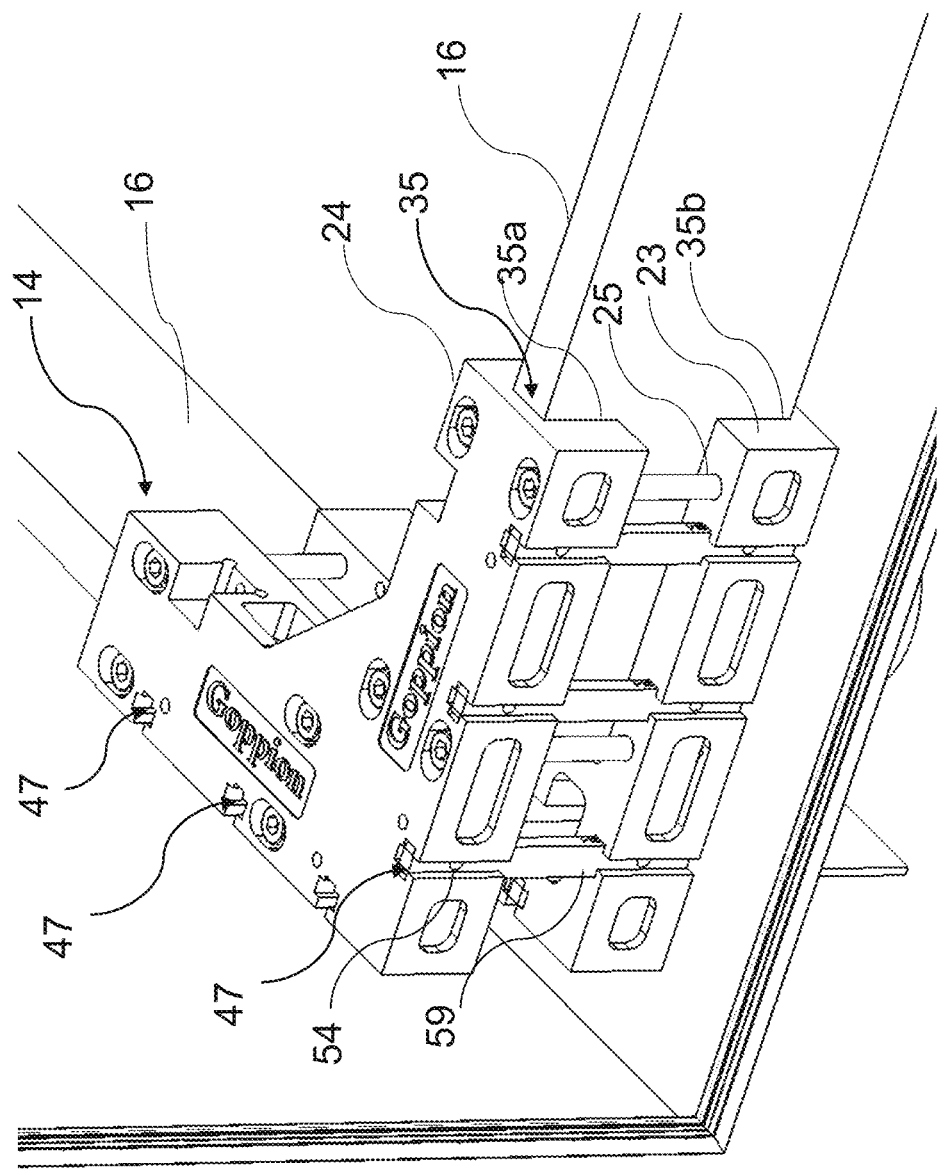
FIGS. 2 to 10 show details of the showcase of FIG. 1, in partially mounted conditions; in particular.
Figure 3:
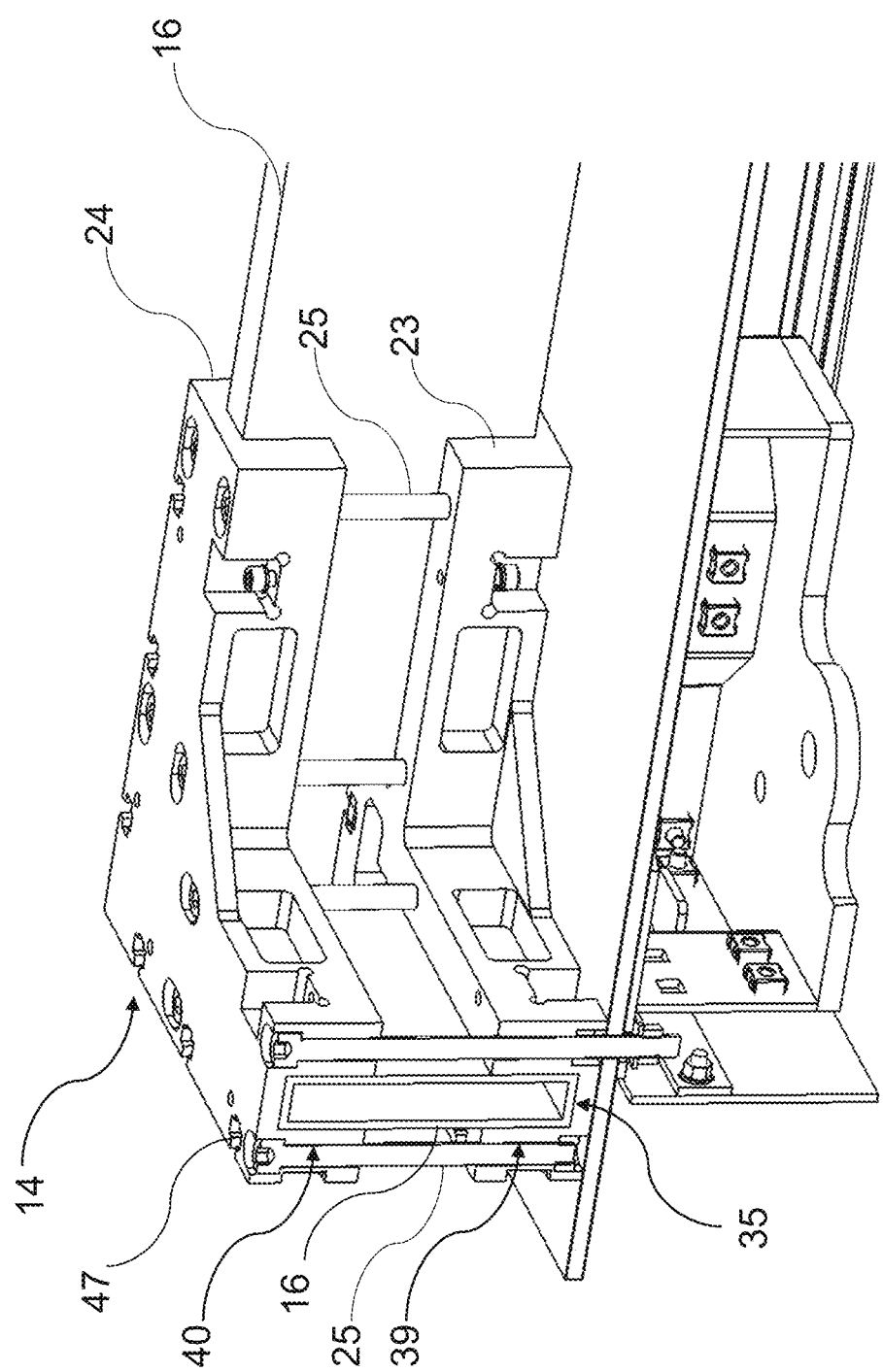
Figure 4:
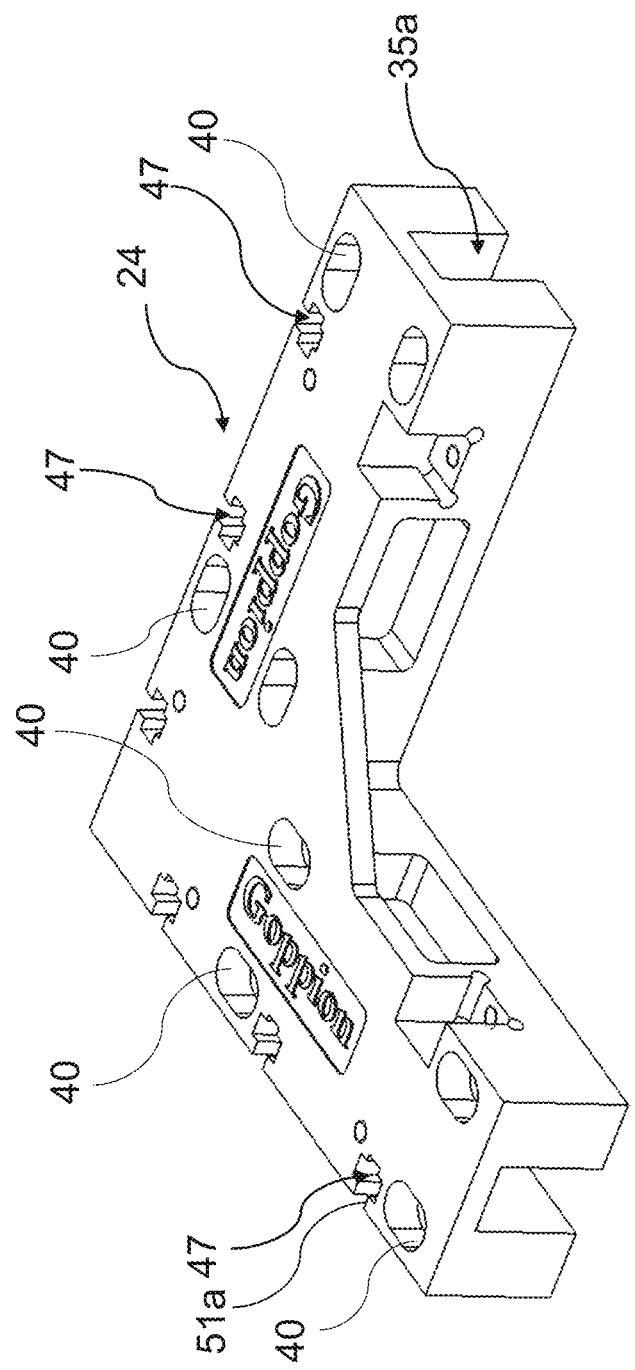
Figure 5:
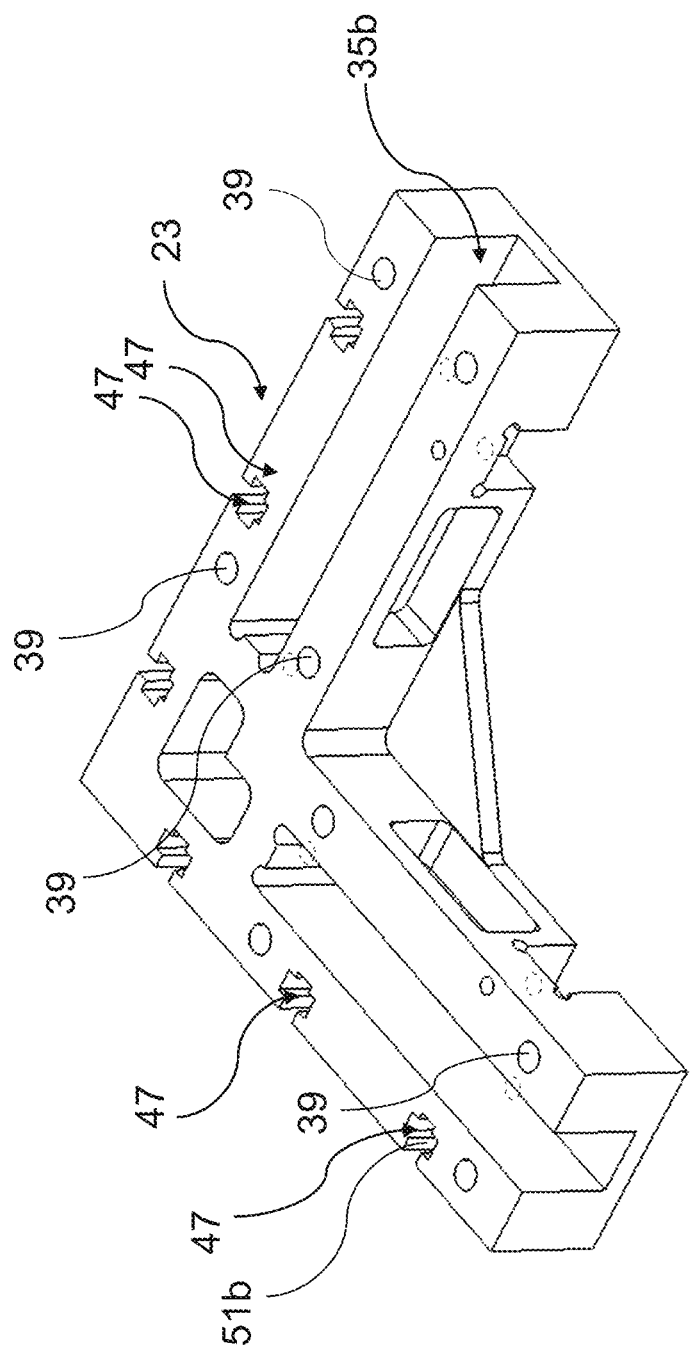
Figure 6:
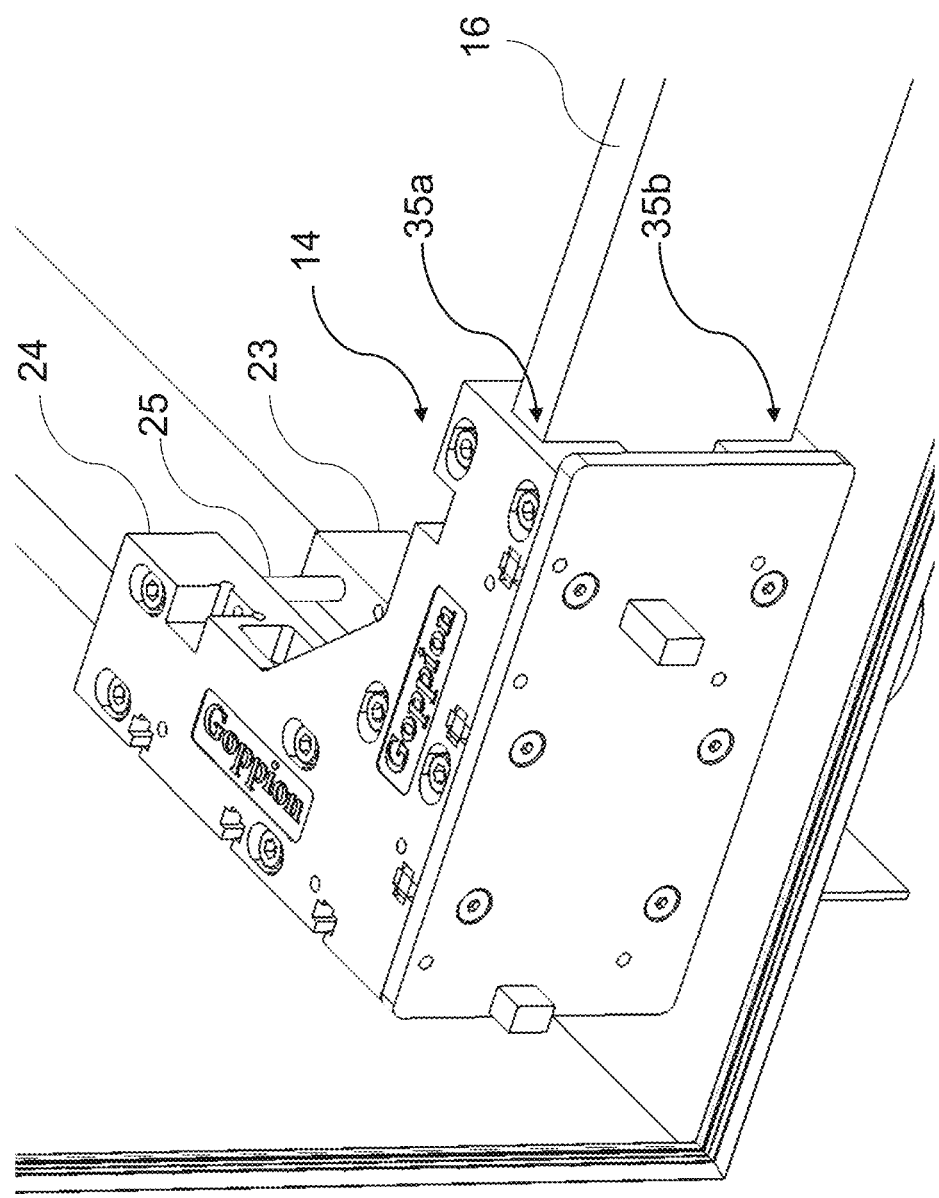
Figure 7:
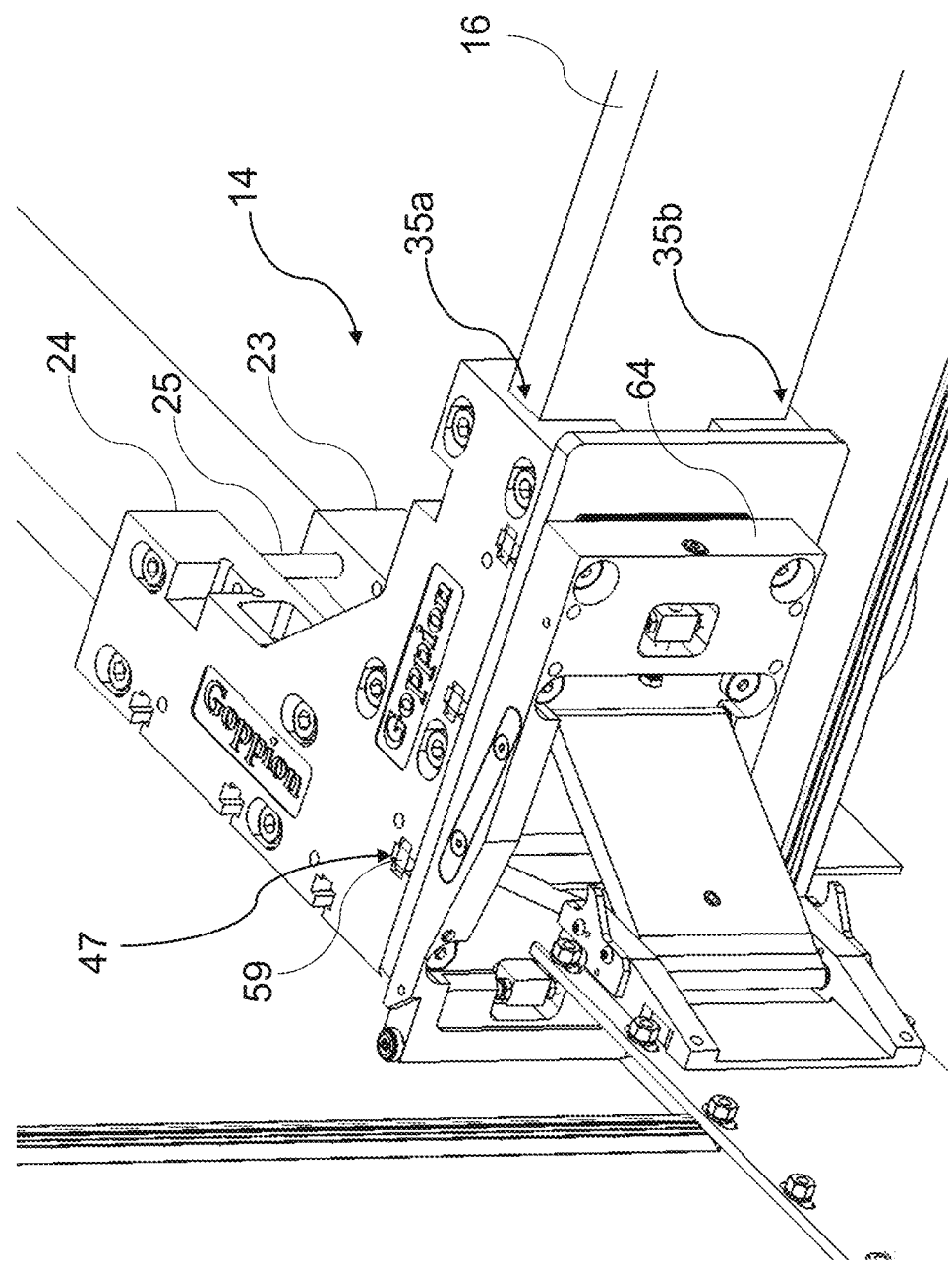
Figure 10:
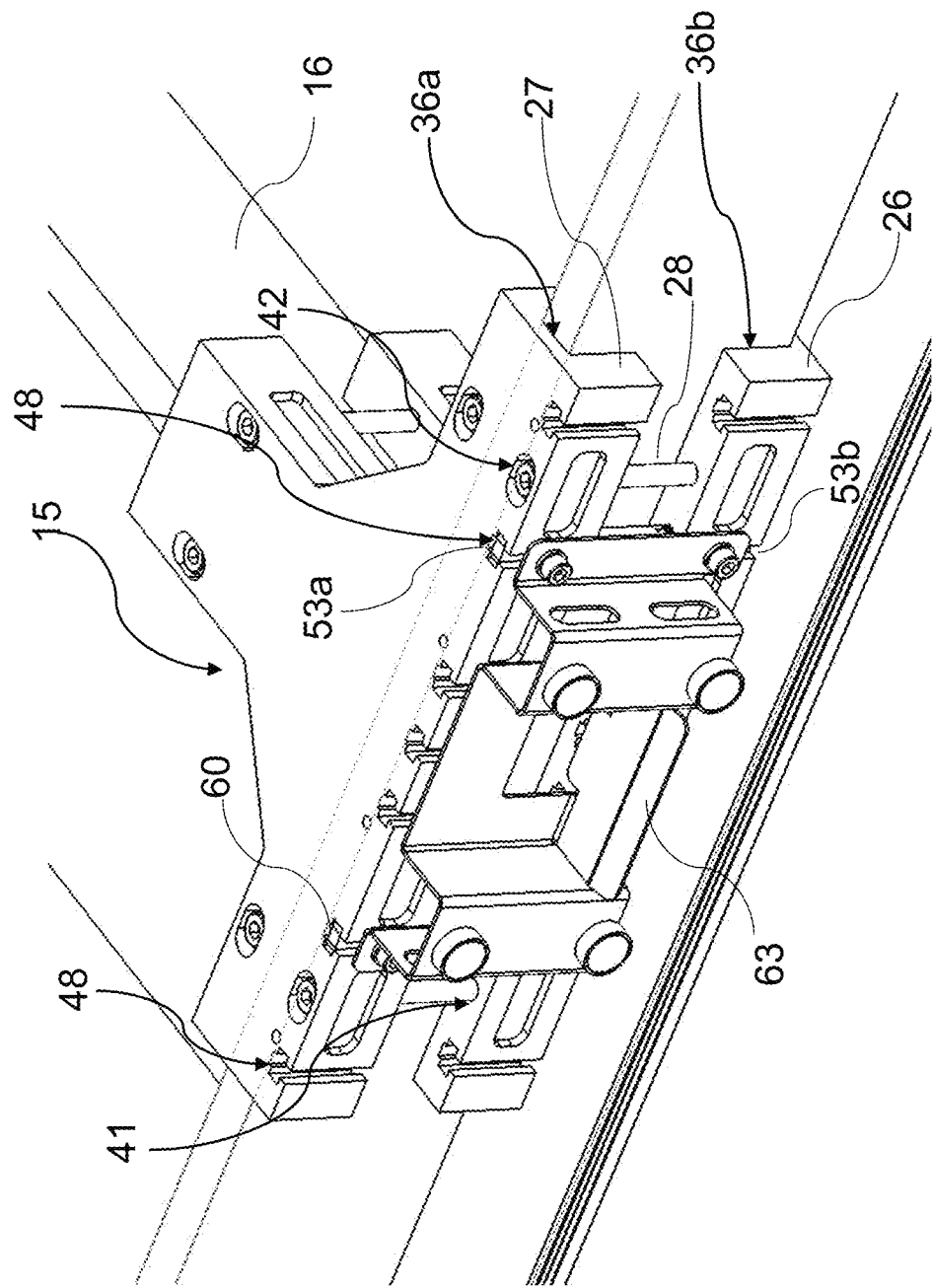
Figure 11:
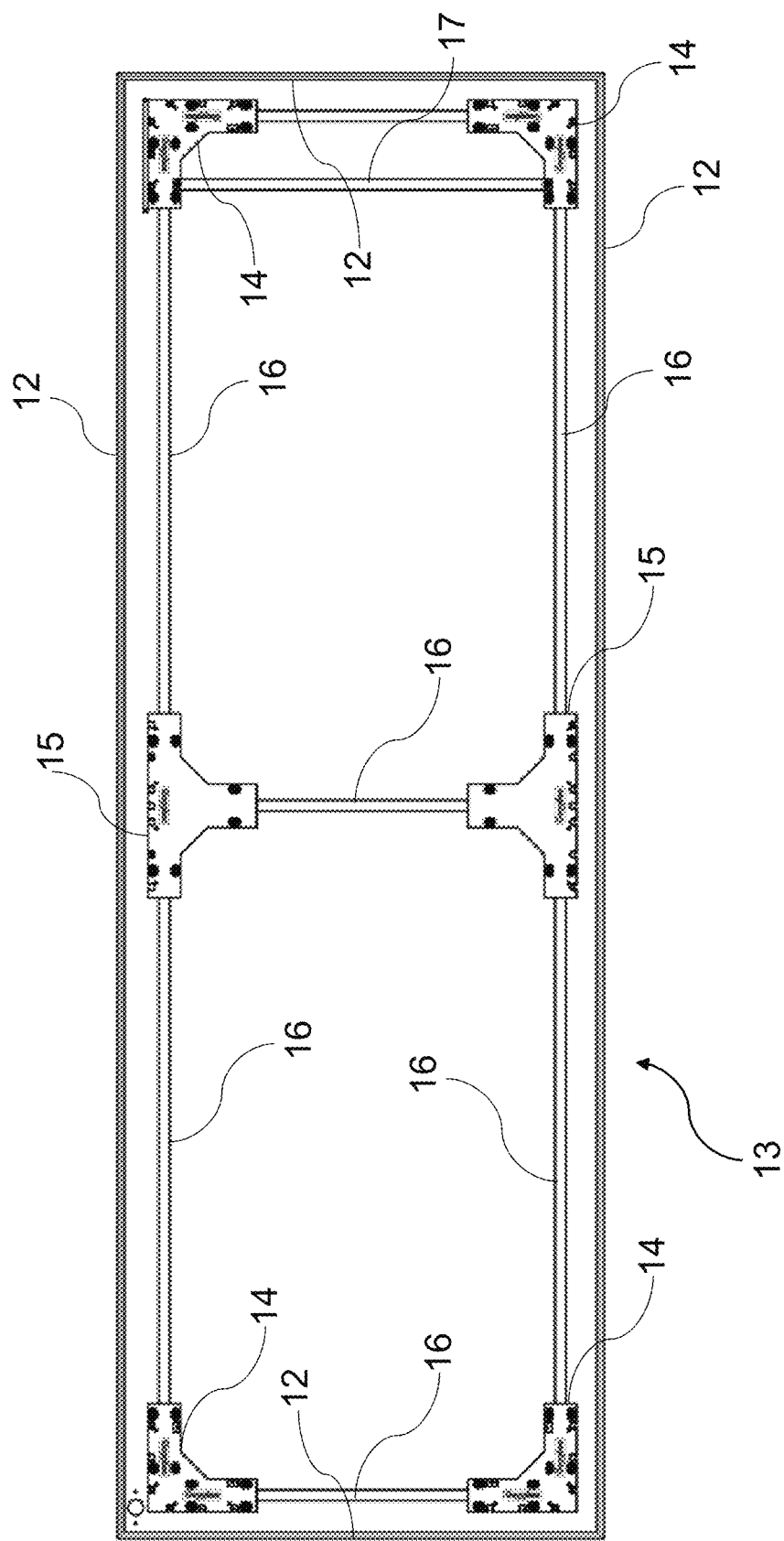
FIG. 11 is a view from above of the showcase of FIG. 1.

Each corner joint 14 comprises a lower shell 23, an upper shell 24 and connecting tie rods 25 between the lower shell 23 and the upper shell 24, as can be seen in FIGS. 2, 3 and 4. Similarly, each intermediate joint 15 comprises a lower shell 26, an upper shell 27 and connecting tie rods 28 between the lower shell 26 and the upper shell 27, as can be seen in FIG. 10. In detail in FIG. 4, it is possible to see the upper shell 24 and in FIG. 5 it is possible to see the lower shell 23; in FIGS. 2 and 3 it is possible to see tie rods 25. In FIG. 10 it is possible to see an intermediate joint 15, with the connecting tie rods 28 between the lower shell 26 and the upper shell 27.

Each corner joint 14 comprises a housing seat 35*a*, formed in the lower shell 23, and a housing seat 35*b*, formed in the upper shell 24. The horizontal beams 16 are housed in the seats 35*a* and 35*b* and are clamped between the lower and upper shells 23 and 24 by means of the tie rods 25. Similarly, each intermediate joint 15 comprises a housing seat 36*a*, formed in the lower shell 26, and a housing seat 36*b*, formed in the upper shell 27. The horizontal beams 16 are housed in the seats 36*a* and 36*b* and are clamped between the lower and upper shells 26 and 27 by means of the tie rods 28.

Each corner joint 14 and intermediate joint 15 comprises threaded holes and through holes. In the corner joint 14, threaded holes 39 are present in one from the upper shell 24 and the lower shell 23 (in the lower shell 23 in the case of the showcase 10 illustrated); through holes 40 are present in the other from the upper shell 24 and the lower shell 23. The tie rods 25 are inserted into the through holes 40 and screwed into the threaded holes 39, as can be seen in FIG. 2. In the intermediate joint 15, threaded holes 41 are present in one from the upper shell 27 and the lower shell 26 (in the lower shell 26 in the case of the showcase 10 illustrated); the through holes 42 are present in the other from the upper shell 27 and the lower shell 26. The tie rods 28 are inserted in the through holes 42 and screwed into the threaded holes 41, as can be seen in FIG. 10.

Each corner joint 14 comprises coupling seats 47, formed on faces pointing towards the outside of the showcase 10, as can be seen in FIGS. 2, 3, 7 and 8. Similarly, each intermediate joint 15 comprises coupling seats 48, formed on faces pointing towards the outside of the showcase 10, as can be seen in FIG. 10.

Each coupling seat 47 comprises an upper shaped channel 51a, formed on the upper shell 24, and a lower shaped channel 51b, formed on the lower shell 23; the upper and lower shaped channels 51a and 51b are aligned with each other. Each coupling seat 48 comprises an upper shaped channel 53a, formed on the upper shell 27, and a lower shaped channel 53b, formed on the lower shell 26; the upper and lower shaped channels 53a and 53b are aligned with each other.

For the attachment (of the walls 12 and of possible other elements or accessories) to the platform 13, the showcase 10 comprises bars inserted in the coupling seats 47 and 48. In particular, the showcase 10 illustrated foresees bars 59 inserted in the coupling seats 47 and bars 60 inserted in the coupling seats 48.

In the bars 59 and 60 threaded holes 54 are formed, as can be seen in FIG. 2 and in FIG. 10.

Figure 8:
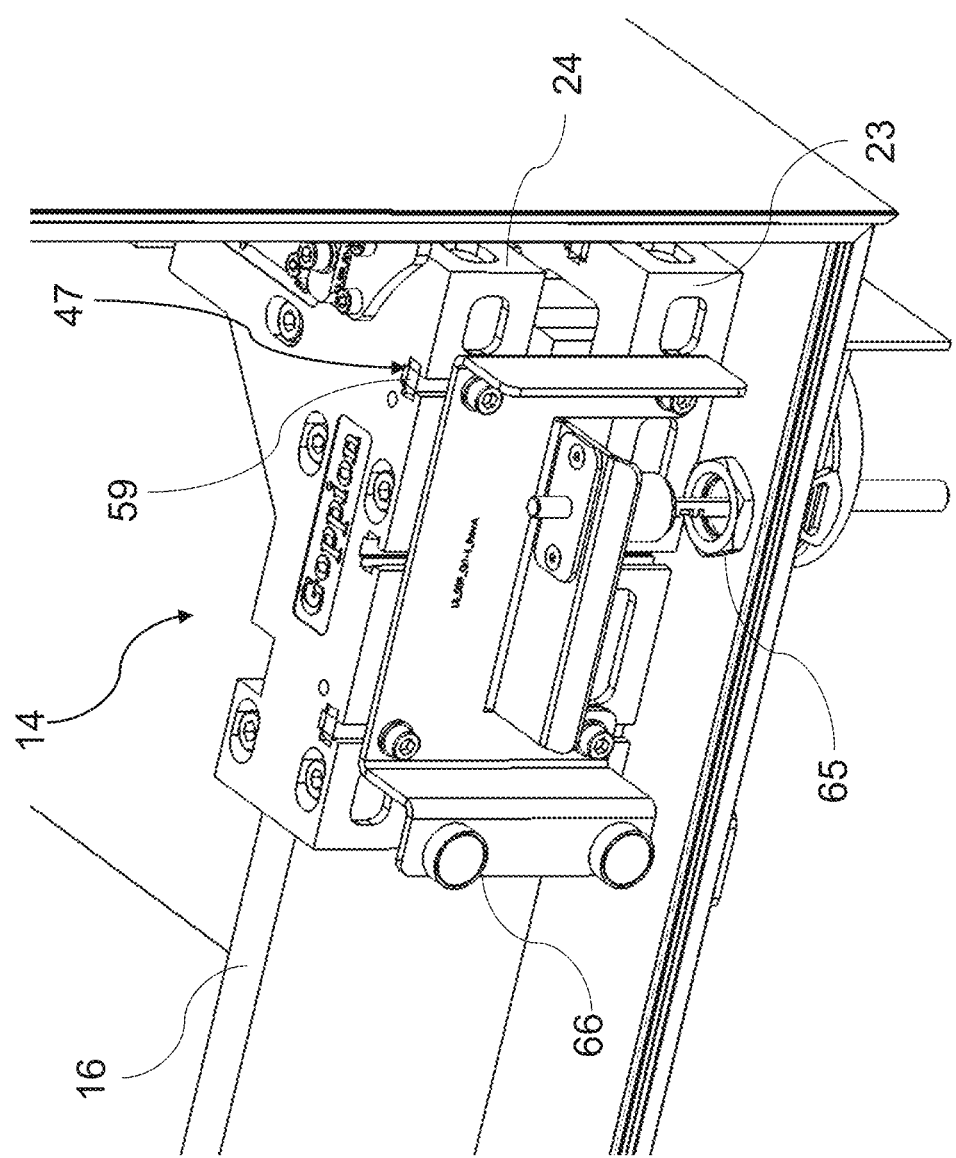

The showcase 10 also comprises supports 63 for fixed walls 12 (see FIG. 9), hinges 64 for mobile walls 12 (see FIG. 7), one or more clamps 65 (see FIG. 8) and sealing devices 66 (see FIGS. 8 and 10). All of these elements are supported by the joints 14 and 15 described above, by means of the coupling seats 47 and 48; of course, the showcase 10 can also comprise other elements and accessories as well as those shown, all supported by the joints 14, 15 by means of the coupling seats 47, 48.

Finally, as can be seen in FIGS. 1 and 3, the showcase 10 comprises feet 67, applied to the joints of the platform, both to the corner joints 14 and to the intermediate joints 15, beneath them.

Figure 12:
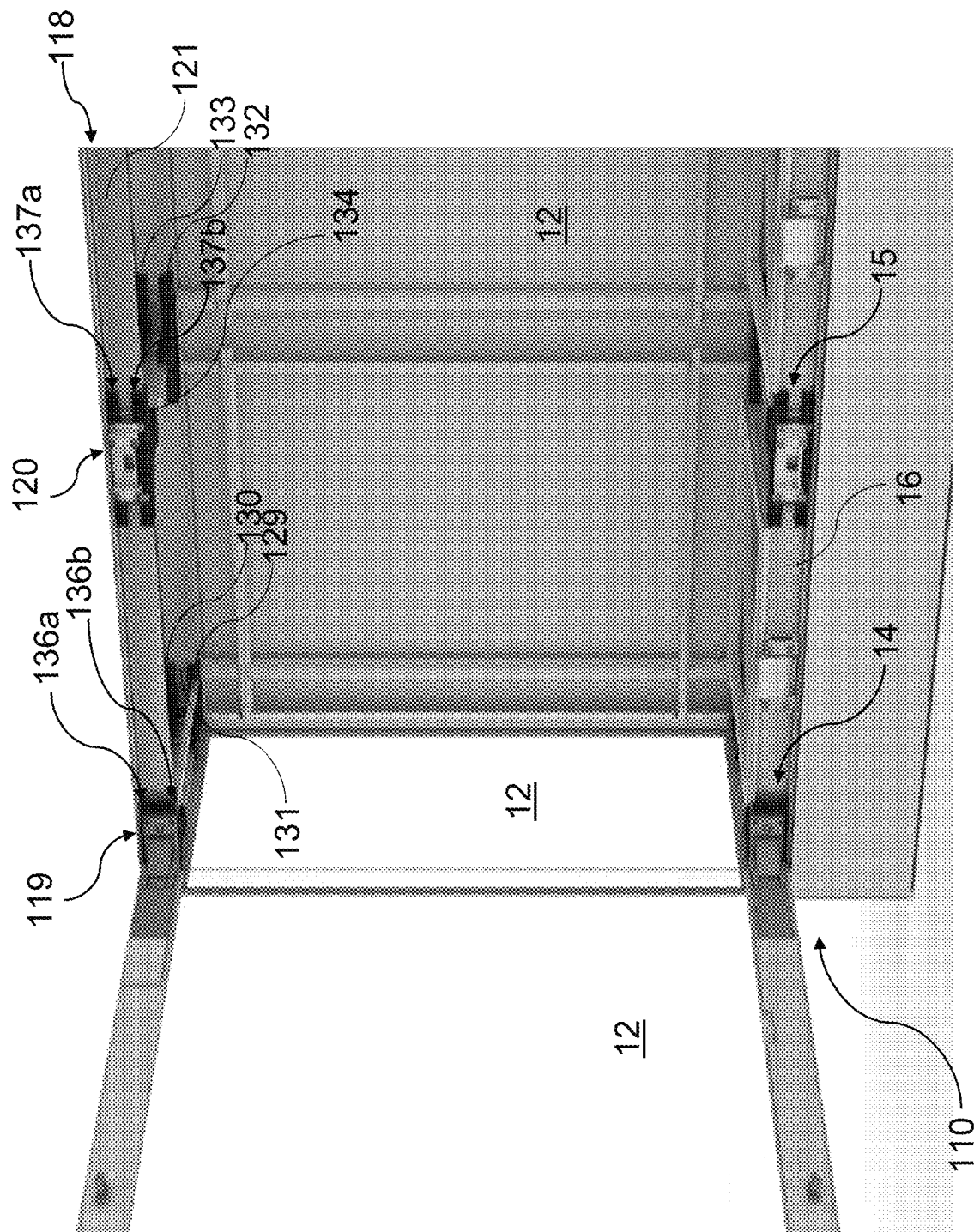
FIG. 12 is an exploded schematic view of a showcase according to another embodiment of the invention.

FIG. 12 shows a showcase 110 according to another embodiment of the invention. The showcase 110 essentially has all of the characteristics of the showcase 10 just described; therefore, the characteristics of the showcase 110 common to the showcase 10 are not described here in detail and in FIG. 12 they are simply indicated with the same reference numerals as the showcase 10.

In particular, the showcase 110 is provided with a platform 13, exactly like the showcase 10.

Differently from the showcase 10, the showcase 110 is provided with a ceiling 118, structured in an analogous manner to the platform 13. The ceiling 118 thus includes upper corner joints 119 and upper intermediate joints 120 connected to upper horizontal beams 121. The upper corner joints 119 are each connected to two upper horizontal beams 121 and the upper intermediate joints 120 are arranged in intermediate positions on the upper horizontal beams 121. The showcase 110 can also comprise vertical beams (not shown in FIG. 12), connected to the corner and intermediate joints 14 and 15 of the platform 13, and to the upper corner and intermediate joints 119 and 120 of the ceiling 118.

Similarly to what is outlined for the platform 13, each upper corner joint 119 comprises a lower shell 129, an upper shell 130 and connecting tie rods 131 between the lower shell 126 and the upper shell 127. Similarly, each upper intermediate joint 120 comprises a lower shell 132, an upper shell 133 and connecting tie rods 134 between the lower shell 132 and the upper shell 133.

Similarly to what is outlined for the platform 13, each upper corner joint 119 comprises a housing seat 136a, formed in the lower shell 129, and a housing seat 136b, formed in the upper shell 130. The upper horizontal beams 121 are housed in the seats 136a and 136b and are clamped between the lower and upper shells 129 and 130 by means of the tie rods 131. Each upper intermediate joint 120 comprises a housing seat 137a, formed in the lower shell 132, and a housing seat 137b, formed in the upper shell 133. The upper horizontal beams 121 are housed in the seats 137a and 137b and are clamped between the lower and upper shells 132 and 133 by means of the tie rods 134.

Similarly to what is outlined for the platform 13, in the upper corner joint 119, there are threaded holes in one from the upper shell 130 and the lower shell 129 and through holes in the other from the upper shell 130 and the lower shell 129; these holes (totally analogous to the holes 39 and 40 of the corner joints 14) are not highlighted in FIG. 12. The tie rods 131 are inserted in the through holes and screwed into the threaded holes. In the intermediate upper joint 120 there are threaded holes in one from the upper shell 133 and the lower shell 132 and through holes in the other from the upper shell 133 and the lower shell 132; these holes (totally analogous to the holes 41 and 42 of the intermediate joints 15) are not highlighted in FIG. 12. The tie rods 134 are inserted in the through holes and screwed into the threaded holes. The tie rods 134 are inserted in the through holes and screwed into the threaded holes.

Each upper corner joint 119 comprises coupling seats analogous to the coupling seats 47 (not visible in FIG. 12), formed on faces pointing towards the outside of the showcase 110. Similarly, each upper intermediate joint 120 comprises coupling seats analogous to the coupling seats 48 (not visible in FIG. 12), formed on faces pointing towards the outside of the showcase 10.

The showcase 110 can comprise vertical beams connected to the joints 14, 15 of the platform 13 and to the upper joints 119, 120 of the ceiling 118. Each corner joint 14 of the platform 13 is connected to a respective one of the vertical beams and this same vertical beam is connected to a corresponding one of the upper corner joints 119 of the ceiling 118; other vertical beams can be connected to the intermediate joints 15 of the platform 13 and to the intermediate joints 120 of the ceiling 118.

Figure 14:
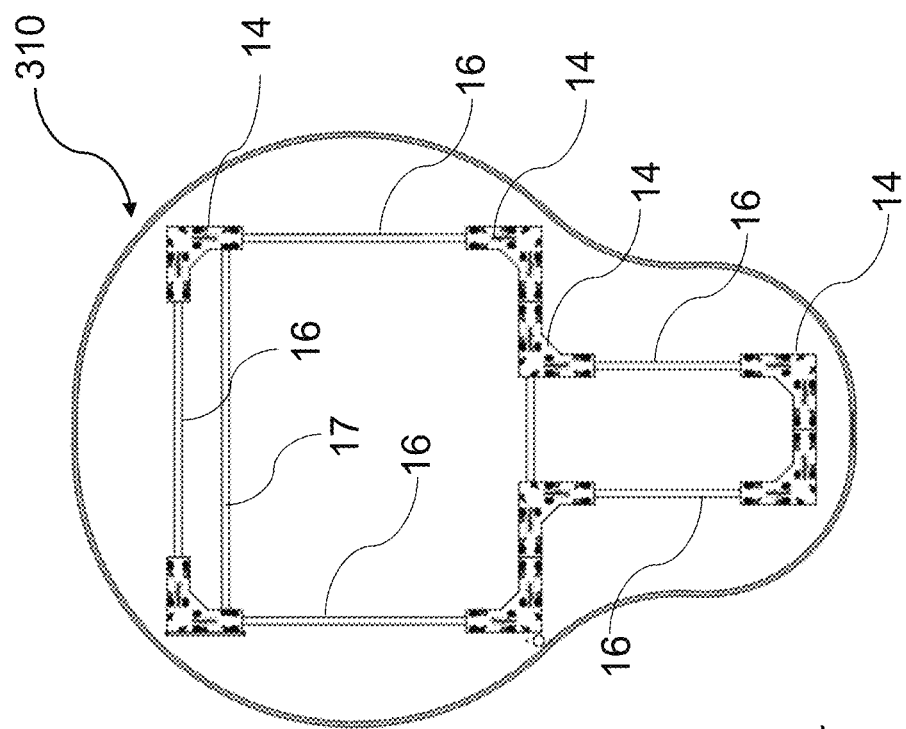
FIGS. 13 and 14 show showcases according to the invention, having a non-parallelepiped shape.
Figure 13:
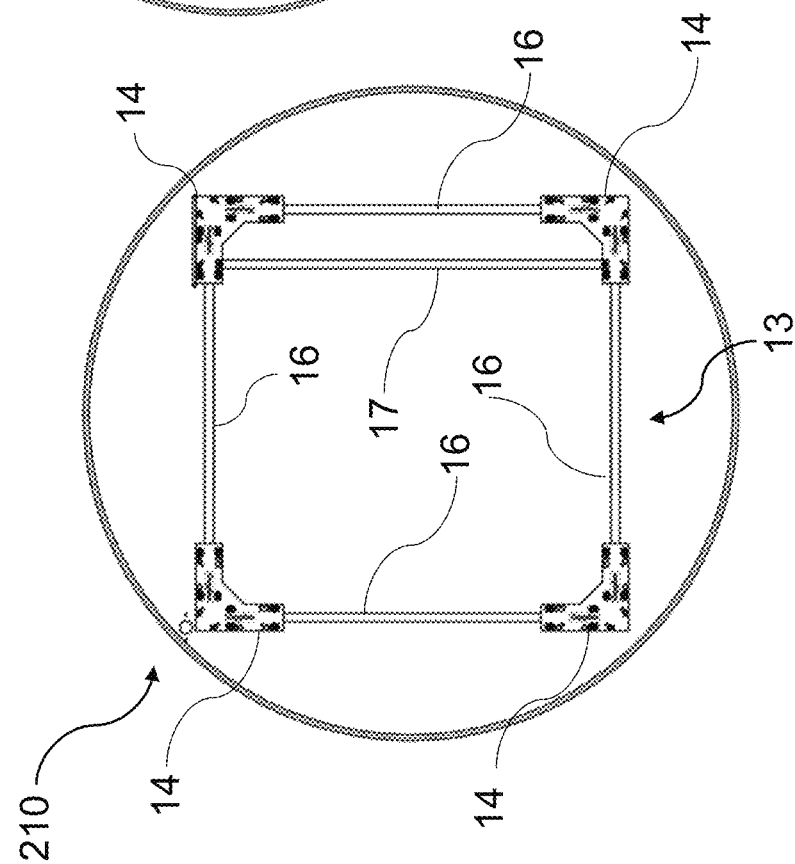

As stated, the present invention makes it possible to design and make museum showcases in a particularly quick and simple manner. This is true for showcases of any shape and size, not only for parallelepiped shaped showcases like the showcase 10. In the case of different shapes, like in the case of the showcases 210 of FIG. 13 and 310 of FIG. 14, it is nevertheless possible to make frames with a shape that approximates the shape of the showcase, using for the support of the walls, depending on the shape thereof, supports of a specific shape or extensions in shaped sheet metal that join the frame (or the frames) to the curvilinear walls of the showcase. It is also possible to combine the frames with each other, so as to make compositions of adjacent showcases. The advantages of the invention remain clearly unchanged.

The invention claimed is:
1. A museum showcase, comprising:
a bearing frame, fixed walls and at least one openable wall supported by the bearing frame, wherein
the bearing frame comprises a platform which includes joints and horizontal beams structurally connected together with the joints, the fixed walls and the at least one openable wall are supported by the joints, the joints being configured to allow the at least one openable wall to open outwardly away from the bearing frame, each of said joints comprises a lower shell, an upper shell, and connecting tie rods between the lower shell and the upper shell, each of said joints comprises coupling seats provided on faces facing towards an outside of the showcase, wherein each of said coupling seats comprises an upper shaped channel formed on the upper shell and a lower shaped channel formed on the lower shell, wherein the upper and lower shaped channels are aligned with each other; and a bar inserted in the upper and lower shaped channels of each of said coupling seats, wherein at least one threaded hole is formed in the bar;

wherein the fixed walls and the at least one openable wall are supported by the joints by fastening to the threaded hole through gaps in said coupling seats.

2. The museum showcase according to claim 1, wherein the joints comprise corner joints, each said corner joint connected to two of the horizontal beams.

3. The museum showcase according to claim 2, wherein the joints comprise intermediate joints, placed in intermediate positions on the horizontal beams.

4. The museum showcase according to claim 1, wherein the platform comprises struts connected to two of the joints.

5. The museum showcase according to claim 1, wherein the bearing frame comprises a ceiling which includes upper joints of said joints connected to upper horizontal beams of said horizontal beams.

6. The museum showcase according to claim 5, wherein the upper joints comprise upper corner joints, each said upper corner joint connected to two of the upper horizontal beams.

7. The museum showcase according to claim 6, wherein the upper joints comprise upper intermediate joints, located in intermediate positions on the upper horizontal beams.

8. The museum showcase according to claim 1, wherein the lower shell and the upper shell comprise respective housing seats for the horizontal beams, wherein each of the horizontal beams that is housed in said housing seats is clamped between said lower and upper shells by means of the tie rods.

9. The museum showcase according to claim 1, wherein each of said joints comprises a threaded hole in one of the upper shell and the lower shell and a through hole in a second of the upper shell and the lower shell, wherein the tie rods are inserted in the through holes and in screwing engagement in the threaded holes.

10. The museum showcase according to claim 1, further comprising supports for the fixed walls.

* * * * *